United States Patent [19]
Koster

[11] Patent Number: 5,996,428
[45] Date of Patent: Dec. 7, 1999

[54] SYSTEM TO TEST THERMAL OXIDIZER EFFICIENCY

[75] Inventor: Robert Elmer Koster, Newtown Square, Pa.

[73] Assignee: SmithKline Beecham Corporation, Philadelphia, Pa.

[21] Appl. No.: 08/913,007

[22] PCT Filed: Sep. 22, 1995

[86] PCT No.: PCT/US95/12139

§ 371 Date: Mar. 21, 1997

§ 102(e) Date: Mar. 21, 1997

[87] PCT Pub. No.: WO96/09495

PCT Pub. Date: Mar. 28, 1996

[51] Int. Cl.$^6$ .................................................. C23C 16/00
[52] U.S. Cl. ............................................................ 73/865.9
[58] Field of Search ............................. 73/865.9; 431/5, 431/13; 122/5, 451 R, 451 S, 451.1

[56] References Cited

U.S. PATENT DOCUMENTS

| | | |
|---|---|---|
| 3,215,126 | 11/1965 | Sprague et al. . |
| 3,671,593 | 6/1972 | Laufer . |
| 3,841,828 | 10/1974 | Cooper . |
| 5,249,551 | 10/1993 | Kirkpatrick . |
| 5,425,812 | 6/1995 | Tsutahara et al. . |
| 5,455,014 | 10/1995 | Costantino et al. . |

*Primary Examiner*—Robert Raevis
*Attorney, Agent, or Firm*—Wayne J. Dustman; William T. King; Charles M. Kinzig

[57] ABSTRACT

An apparatus (9) for testing the efficiency of a thermal oxidizer (200) is described. The apparatus provides for a test chemical to be directed into a thermal oxidizer so that the entry and exit flow rates of test chemical through the termal oxidizer may be accurately measured. In a portable version, the apparatus is formed of a platform (10), a tank (26) for holding liquid test chemical to test chemical vapor, and a device (94) to measure the flow rate that liquid test chemical enters the vaporizer from the tank. Methodology employing the apparatus, which provides numerical data useful in determining the efficiency of a thermal oxidizer, is described.

24 Claims, 1 Drawing Sheet

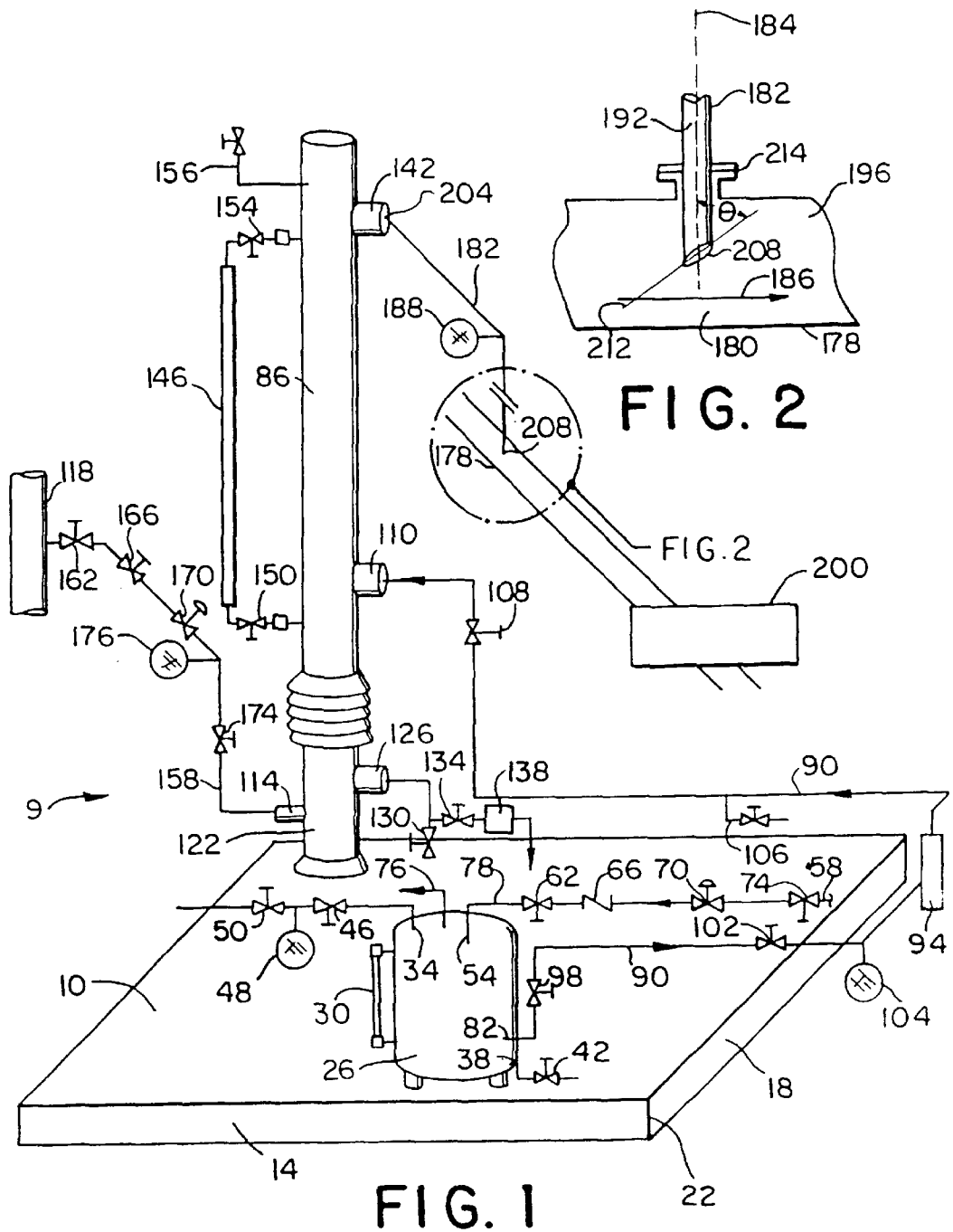

SYSTEM TO TEST THERMAL OXIDIZER EFFICIENCY

FIELD OF THE INVENTION

The present invention relates to an apparatus useful for determining the efficiency of a thermal oxidizer, as well as a method for using the apparatus.

BACKGROUND OF THE INVENTION

In many manufacturing settings there is a need to dispose of waste gas streams. While the simplest and least expensive disposal method is to exhaust the gas stream into the ambient atmosphere, such a disposal method may cause harm to the environment, and may violate federal, state or local pollution control laws in those instances where the waste gas stream contains organic chemicals. It has therefore become common practice to pass waste gas streams through a scrubber, in order to remove certain organic components from the gas stream and allow the gas stream to be safely exhausted into the atmosphere.

One device commonly used for removal of organic chemicals from a waste gas stream is a thermal oxidizer. In a typical thermal oxidizer, the waste gas stream is combined with an oxygen-containing gas stream, e.g., air, and then passed through a flame produced by burning a combustible substance, e.g., natural gas. This process oxidizes the organic chemicals and converts them into carbon dioxide and water. The thermal oxidizer thus converts certain organic chemicals into environmentally harmless chemicals that may be safely exhausted into the atmosphere. In many modern manufacturing plants, thermal oxidizers are permanently installed in gas exhaust ducts.

While in theory and preferred practice, a thermal oxidizer can oxidize all or substantially all of the undesirable organic chemicals in a waste gas stream, in actual practice the thermal oxidizer may not be working as expected or desired. For example, the incoming waste gas stream may be flowing too quickly to allow complete oxidation of all the component organic chemicals, or there may be inadequate contact between the waste gas stream and the flame. It is therefore desirable, and often required under pollution control laws, to periodically test the efficiency of a thermal oxidizer.

To calculate the efficiency of a thermal oxidizer, one needs to determine the extent to which incoming organic chemicals are oxidized to carbon dioxide and water. Thus, one needs to know the mass flow rate of the organic chemicals entering the thermal oxidizer. Commonly, and according to procedures set forth by the United States Environmental Protection Agency (EPA), a test chemical is introduced into a waste gas stream at a point prior to the waste gas stream being subjected to oxidization in the thermal oxidizer, i.e., upstream of the thermal oxidizer. The test chemical should be introduced to the gas stream at a known and controllable mass flow rate, which is assumed to be the mass flow rate at which the test chemical enters the thermal oxidizer.

When the test chemical is a gas, one can reasonably assume that the measured rate at which the test chemical enters the gas stream, on the inlet side of a thermal oxidizer, is equal to the actual rate at which the test chemical enters the thermal oxidizer. However, when the test chemical is a liquid, the same assumption may not hold true. For example, according to the prior art, a liquid test chemical may be injected into the inlet waste gas stream by way of an atomizer placed inside the duct that directs a waste gas stream into the thermal oxidizer. This is known as the aspirator technique of introducing liquid test chemical into a waste gas stream. While it is easy to monitor the rate at which the liquid test chemical is sent through the atomizer, one may find, after the efficiency test is completed, that the duct(s) between the atomizer and the thermal oxidizer is covered by droplets, if not pools, of the liquid test chemical. In this situation, one cannot use the measured rate that liquid test chemical is sent into the duct as a basis for determining the efficiency of the oxidizer, because that measured rate is clearly not equal to, and has no known correlation with, the rate that test chemical actually enters the oxidizer.

Based on the foregoing, it can be seen that there is a pressing need in the art for an apparatus and method for reliably introducing a known and controlled rate of liquid test chemical into a thermal oxidizer, so that the efficiency of the thermal oxidizer can be accurately determined.

SUMMARY OF THE INVENTION

Briefly stated, one aspect of the present invention is an apparatus for testing the efficiency of a thermal oxidizer. The apparatus comprises (a) a tank containing at least one liquid test chemical; (b) a vaporizer, in fluid communication with the tank, for vaporizing the at least one liquid test chemical to form test chemical vapor; (c) a thermal oxidizer for oxidizing organic components in a gas stream; (d) a duct in fluid communication with the thermal oxidizer for directing a waste gas stream into an inlet side of the thermal oxidizer, the duct also being in fluid communication with the vaporizer to allow the test chemical vapor and the waste gas stream to form a first mixture in the duct, the mixture entering an inlet side of the thermal oxidizer and exiting an outlet side of the thermal oxidizer having been converted thereby to a clean gas stream; (e) means for measuring a flow rate of the at least one liquid test chemical entering the vaporizer from the tank; and (f) means for measuring a flow rate of the test chemical vapor or oxidation product thereof exiting the thermal oxidizer.

According to another aspect of the invention, a portable apparatus useful in measuring the efficiency of a thermal oxidizer is provided. The portable apparatus comprises (a) a platform having either directly or indirectly mounted thereto (i) a tank holding at least one liquid test chemical (ii) a vaporizer, in fluid communication with the tank, for vaporizing the at least one liquid test chemical received from the tank to form test chemical vapor, and (b) means for measuring a flow rate of the at least one liquid test chemical entering the vaporizer from the tank.

The invention also provides a method for determining the efficiency of a thermal oxidizer. The method comprises the steps of (a) introducing at least one liquid test chemical into a vaporizer at a measured flow rate over a period of time; (b) vaporizing the test chemical to form test chemical vapor; (c) directing the test chemical vapor into an entry duct of a thermal oxidizer, the duct containing a gas stream which is combined with the test chemical vapor to form a first mixture; (d) directing the first mixture through the entry duct and into an inlet side of the thermal oxidizer; (e) measuring a flow rate of the test chemical vapor or a oxidation product thereof exiting an outlet side of the thermal oxidizer; and (f) calculating the efficiency based on the flow rates of steps (a) and (e).

BRIEF DESCRIPTION OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

Like numerals are used to indicate like elements throughout the drawings. In the drawings:

FIG. 1 is a schematic representation of an efficiency tester according to the present invention mounted on a skid according to the invention; and FIG. 2 is an enlarged cross-sectional view of an injection nozzle of the efficiency tester of FIG. 1.

DETAILED DESCRIPTION OF THE PREFERRED EMBODIMENTS

Certain terminology is used in the following description for convenience only and is not limiting. The words "above" and "below" designate directions in the drawings to which reference is made. The words "upstream" and "downstream" refer to the direction of the flow of a gas in a passageway, i.e., gas flows from the "upstream" end of a pipe toward the "downstream" end of a pipe. The terminology includes the words above specifically mentioned, derivatives thereof, and words of similar import.

The invention is directed to an apparatus and method useful in determining the efficiency of a thermal oxidizer. A preferred apparatus of the invention, and its operation to test the efficiency of a thermal oxidizer, will now be explained with reference to FIGS. 1 and 2. The apparatus 9 of FIGS. 1 and 2 may be utilized in the United States EPA test Method Nos. 18, 26A and 7D for determining the efficiency of a thermal oxidizer. The disclosures of these EPA test Methods are herein incorporated by reference, in their entirety.

FIG. 1 shows a platform in the form of a skid 10, to which the other components of the apparatus are directly or indirectly connected. A preferred skid 10 has a length 14 of about 6 feet, a width 18 of about 6 feet, and a height 22 of about 1 foot. The skid 10 preferably contains slots of approximately 8 inch (20 cm) cross-section (not shown) to receive the arms of a forklift, so that the skid 10 can be transported. As the apparatus of the invention typically weighs several hundred pounds, the skid 10 is preferably constructed of a sturdy material, such as, for example, aluminum plate of ¼ inch thickness. Such a skid may be constructed by Innofab Corp. of Norristown, Pa.

It will be understood by one skilled in the art, based on this disclosure, that if portability is not a desired or necessary feature of the apparatus 9, then the following components could be mounted to concrete or any other solid foundation, to thereby permanently locate the apparatus near a thermal oxidizer. However, an advantage of mounting the below-described components of the apparatus 9 to a skid 10 is that the apparatus 9 is then portable, and can be moved between thermal oxidizers. Because it is not necessary to constantly monitor the efficiency of a thermal oxidizer, a portable testing apparatus 9 according to the invention offers the advantage that it can be relocated to various thermal oxidizers when compliance testing is desired, thus making efficient use of the efficiency tester.

Connected to the skid 10 or other suitable base is a holding tank 26, preferably having an appended sight gauge 30 as shown. Liquid test chemical (not shown) is stored in the tank 26, prior to entering a vaporizer 86. The capacity of the holding tank 26 will depend on the amount of test chemical desirably sent through the vaporizer. For example, a 240 gallon (910 liter) holding tank is satisfactory for use when the test chemical is toluene, while a 135 gallon (510 liter) holding tank is satisfactory when the test chemical is methylene chloride. A preferred holding tank 26 is ASME code pressure rated to a pressure of about 125 psig, and is available from John Wood Co. (Oaks, Pa).

The sight gauge 30 allows the operator to easily see approximately how much test chemical is in the holding tank 26. Such a sight gauge 30 suitable for use in the apparatus 9 is available from A. T. Chadwick (Bensalem, Pa).

Built into the holding tank 26 is a filling port 34, through which liquid test chemical may be added to the holding tank 26, and a drain port 38, which allows liquid test chemical to be drained from the tank 26. If the apparatus 9 is portable, the holding tank 26 is preferably drained prior to the apparatus 9 being transported to another site for an efficiency measurement. The drain port 38 is in fluid communication with a ball valve 42, for opening and closing the drain port 38. Likewise, the filling port 34 is in fluid communication with a series of two ball valves, 46, 50, which flank a pressure indicator 48 that is useful to indicate the chemical fill line pressure. Test chemical may be charged to the holding tank 26 from bulk storage tanks (not shown), using pumps (not shown) and a suitable conduit (not shown) such as, for example, ½ inch (1.24 cm) Hytron™ transfer hose. Suitable hosing is available from Airline Hydraulics (Bensalem, Pa).

As a thermal oxidizer's efficiency is stated in terms of the effectiveness of the thermal oxidizer at removing a chemical (s) from a waste gas stream, the liquid test chemical used to evaluate the efficiency of the thermal oxidizer is preferably the same or similar to the chemical to be removed. Thus, if the objective is to determine the efficiency of a thermal oxidizer at removing toluene, for example, from a waste gas stream, the preferred test chemical to be used in the apparatus 9 is toluene.

Preferred liquid test chemicals for use in the present invention include toluene and methylene chloride. Toluene is preferred for determining the efficiency of a thermal oxidizer at removing hydrocarbons, and especially aromatic hydrocarbons, from a waste gas stream. Methylene chloride, being a chlorinated hydrocarbon, is preferred for determining the efficiency of a thermal oxidizer at removing chlorinated hydrocarbons from a waste gas stream. A liquid test chemical according to the invention may also be a mixture of liquid test chemicals, e.g., a mixture of toluene and methylene chloride.

While toluene and methylene chloride are preferred liquid test chemicals, other suitable liquid test chemicals include, for example and without limitation, amyl alcohol, butyl acetate, butyl alcohol, chloral, cyclohexanone, decane, ethyl benzene, furfural alcohol, isoamyl alcohol, isoamyl acetate, isobutyl alcohol, isobutyl acetate, methyl isobutyl ketone, tetrahydrofuran and xylene.

According to the invention, the holding tank 26 is in fluid communication with vaporizer 86, and there is (1) a forcing means for forcing the liquid test chemical from the holding tank 26 into the vaporizer 86 in a continuous, controllable and rate-determinable manner, and (2) a controlling means for controlling the flow rate of the liquid test chemical entering the vaporizer 86 from the holding tank 26.

In a preferred embodiment of the invention, the forcing means preferably includes a pressurized gas, such as from a cylinder, venturi valve, blower or similar apparatus for providing pressurized gas. The pressurized gas is preferably from a cylinder of gas, preferably nitrogen gas from a cylinder at location 58 (gas cylinder not shown). When the efficiency tester is in operation, the pressured gas impinges on liquid test chemical situated in the holding tank 26. The pressurized gas exerts force on the liquid test chemical, causing the chemical to be expelled from the tank 26, run through piping 90, and enter the vaporizer 86. Thus, the pressurized gas is in fluid communication with, and upstream of, the liquid test chemical.

According to the preferred embodiment shown in FIG. 1, the holding tank 26 includes a port 54 to provide for fluid communication between the tank 26 and a source of pressurized gas (not shown) at location 58 via piping 78. The pressurized gas is preferably nitrogen but may also be compressed air, and preferably is capable of exerting at least about 35 psig pressure on the test chemical. About 5 to about 10 psig pressure is sufficient to provide a test chemical entry rate, into the vaporizer 86, of about 200 lb/hr (about 90 kg/hr) for methylene chloride, and about 600 lb/hr (about 270 kg/hr) for toluene. Suitable vaporizer 86 entry flow rates for the liquid test chemical according to the present invention range from about 35 kg/hr to about 500 kg/hr, depending on the design of the vaporizer.

Forcing means other than pressurized gas may be employed according to the invention, for forcing liquid test chemical into the vaporizer 86. For example, the tank 26 of liquid test chemical may be held at an altitude above the vaporizer 86, so that gravity can be exploited to provide sufficient forcing energy. Another suitable forcing means is a pump that is situated in the piping 90 that runs from the holding tank 26 to the vaporizer 86. Based on this disclosure, one skilled in the art will understand that other forcing means may be used in the present invention as long as the forcing means provides sufficient constant energy to force test chemical from the tank 26 through piping 90 to vaporizer 86.

The controlling means preferably includes a valve, such as valve 70, preferably positioned between the holding tank 26 and the gas cylinder (not shown) at position 58, which allows the pressure exerted on the liquid test chemical to be controlled. The valve preferably serves as the controlling means for controlling the flow rate of the liquid test chemical entering the vaporizer 86.

According to the preferred apparatus 9 shown in FIG. 1, valves 62, 66, 70 and 74 are positioned in pipe 78. Valve 66 is a check valve, used help prevent liquid test chemical from flowing backward and entering the source of pressurized gas (not shown) located at position 58. Globe valve 70 is a pressure control valve, which can regulate the pressure of gas exiting the cylinder (not shown) at position 58, to allow for a suitable and controllable pressure to be exerted against the liquid test chemical. Ball valves 62 and 74 are preferably present in order to allow control valve 70 to be isolated for repair and adjustments as necessary.

Also connected to the holding tank 26, according to a preferred embodiment of the invention, is a pressure relief valve 76, that may be used to relieve any excess pressure that builds up in the holding tank 26. The relief valve 76 preferably has a pressure rating of 40–45 psig.

Also built into the holding tank 26 is an exit port 82, which is preferably in fluid communication with the vaporizer 86. Installed in-line with piping 90, where piping 90 connects the tank 26 to the vaporizer 86, is a means for measuring the flow rate at which liquid test chemical enters the vaporizer 86. A preferred measuring means is a flowmeter 94 as shown in FIG. 1, positioned in-line with piping 90. The flowmeter 94 measures the flow rate of the liquid test chemical in piping 90 exiting the holding tank 26 and entering the vaporizer 86.

It should be understood from this discussion that any suitable flowmeter for monitoring the flow rate of liquid test chemicals may be used with the present invention. Preferably, a floating ball flowmeter, or rotameter, is used as the flowmeter in the present invention. Such a flowmeter is available as Model 1110 from Brooks Instruments (Ambler, Pa). Preferably, the flowmeter responds to changes in the temperature of the fluid passing through the meter, and has a design accuracy of ±2% of the calibrated flow rate. Thus, the flowmeter is preferably calibrated for the specific test chemical being employed.

Suitable piping, such as piping 78 and 90, that may be used throughout the apparatus as shown in FIGS. 1 and 2, is Schedule 40 carbon steel having 1.5 inches (3.8 cm) fiberglass insulation. The pipe preferably has an inner diameter (ID) sufficient to allow about 70 lb/hr to about 210 lb/hr of liquid test chemical to pass through the pipe. Preferably in-line with piping 90 that leads from the exit port 82 to the flowmeter 94 are two ball valves, 98 and 102 as well as a pressure indicator 104. Valve 98 allows for the chemical flow from tank 26 to be shut off in an emergency. Valve 102 is used to adjust and maintain a steady flow of liquid test chemical into the flow meter 94. A drain valve 106 is positioned in the piping 90 between the flowmeter 94 and the vaporizer 86. The drain valve 106, when open, allows for liquid test chemical to be drained from the piping 90. Another valve, 108, is preferably placed in-line with piping 90 at a site just before the piping 90 is connected to the vaporizer 86. The valve 108 allows for quick shut off of the test chemical to the vaporizer 86, and eliminates the need to readjust valve 102 during shut down and start up of the thermal oxidizer efficiency test procedure.

The vaporizer 86 is capable of converting liquid test chemical, i.e., an organic chemical in a liquid state that will be used to test the efficiency of the thermal oxidizer, to test chemical vapor, i.e., vaporized liquid test chemical. It will be understood from this disclosure that any suitable vaporizer may be used in the present invention. Preferably, the vaporizer 86 contains an entry port for introducing the liquid test chemical into the vaporizer, a chamber wherein the liquid test chemical is converted to test chemical vapor, and an exit port for the exit of test chemical vapor from the vaporizer. As shown in FIG. 1, the longitudinal axis of the vaporizer 86 is preferably perpendicular to the plane in which the skid 10 or other platform lies. However, the longitudinal axis of the vaporizer may also be situated parallel to the plane in which the skid 10 or other platform lies.

As shown in FIG. 1, the vaporizer 86 contains a first entry port 110, in fluid communication with the holding tank 26, and a second entry port 114, in fluid communication with a source of steam 118. The first entry port 110 allows for the introduction of liquid test chemical into the vaporizer. The base 122 of the vaporizer 86 is preferably connected to the skid 10. More preferably, the vaporizer 86 is bolted or welded to the skid 10. Proximate to the base 122 is a drain port 126, in fluid communication with valves 130 and 134, and steam trap 138. The valve system 130 and 134 is useful to provide a quick heat-up of the vaporizer. Thus, valve 134 may be closed, then valve 130 opened, condensate quickly blown through valve 130, and after quick heat-up has been achieved, valve 130 is closed and valve 134 opened to the steam trap for normal operation. The vaporizer 86 also contains an exit port 142, through which a stream of test chemical vapor in combination with steam, may exit.

A preferred vaporizer incorporates a sight gauge 146, which is a piece of pipe preferably appended to the outside of the vaporizer 86, and parallel to the longitudinal axis of the vaporizer as shown in FIG. 1, much like a handle runs along the outside of a mug. Suitable sight gauges have a transparent region to allow an operator to see the level of chemical liquid and/or vapor that is inside the vaporizer. The sight gauge preferably runs from a site just above the entry port 110 for the liquid test chemical, and extends to a site just below the exit port 142 for the test chemical vapor. A sight gauge so situated allows an operator to see what is happening along a substantial length of the vaporizer 86, particularly in the region of the vaporizer 86 where the liquid test chemical is converted to a stream of test chemical vapor.

As shown in FIG. 1, the sight gauge 146 is connected to the vaporizer 86 through a lower valve 150 and an upper valve 154. The valve 150 is preferably positioned longitudinally between the first and second entry ports, 110 and 114, respectively. The upper valve 154 is preferably positioned approximately opposite the exit port 142. The diameter of the sight gauge is not critical. However, in a preferred embodiment of the invention, a diameter of about 1 inch (2.54 cm) is suitable for the sight gauge.

The second entry port 114 is in fluid communication with a source of steam 118 by way of piping 158. The piping 158 preferably has an inner diameter of about 1.5 inches (3.8 cm), and is capable of carrying steam having a pressure of at least about 80 to about 110 psig (about 550 to about 750 kPa). Valves 162 (hand valve), 166 (hand valve), 170 (pressure control valve), and 174, are positioned in-line the piping 158, and serve to control the pressure and flow of steam between the source of steam 118 and the second entry port 114 of the vaporizer 86. A pressure indicator 176 is positioned in-line with the pipe 158, between the valves 170 and 174. Preferably, the steam enters the vaporizer through the second entry port 114 at a pressure of about 15 to about 35 psi (about 100 to about 230 kPa) as regulated by valve 170. The preferred steam pressure is determined by the liquid test chemical used and the rate the liquid test chemical enters the vaporizer. Higher steam pressures are preferred for liquid test chemicals that have high boiling points. Valve 156, which extends from the top of the vaporizer 86, is a manual air release vent valve.

A preferred vaporizer 86 according to the invention is configured for providing contact between the liquid test chemical and steam from the source 118 of pressurized steam. When the steam contacts the liquid test chemical, the liquid test chemical is converted to test chemical vapor, thus forming a mixture of steam and test chemical vapor within the vaporizer. While the preferred vaporizer of the invention employs steam as an energy source to convert test chemical from a liquid to a vapor state, alternative energy sources may be employed, with appropriate changes to the vaporizer 86. For example, the vaporizer 86 might employ a heated coil (not shown) that extends through the vaporization chamber (not shown), so that liquid test chemical that comes into contact with the coil will be heated and converted into vapor. Gas, oil and electric (resistance) heating may all be employed in a vaporizer useful in the invention.

Materials useful in the construction of vaporizers are well known in the art, and any such materials are suitable for preparing a vaporizer according to the instant invention. Preferred construction materials are largely or completely inert, i.e., substantially unreactive with, both liquid test chemical and test chemical vapor, under the conditions employed within the vaporizer. Suitable materials include, for example, stainless steel, carbon steel, monel, nickel or other metals or metal alloys, polyvinylchloride or other plastics, glass, etc., as well as composites thereof.

Suitable vaporizers may be obtained from many suppliers. The Thomas Register (1995 Edition), under the heading "vaporizers", lists various manufacturers, located throughout the United States, that can provide suitable vaporizers. The preferred vaporizers 86 of the invention are those vaporizers capable of converting liquid organic solvents to solvent vapor in a continuous fashion, i.e., the vaporizer 86 is preferably a continuous vaporizer, where a continuous vaporizer simultaneously accepts an incoming stream of liquid test chemical and expels a vapor stream of test chemical, so that the mass flow rate at which the test chemical enters the vaporizer is substantially equal to the mass flow rate at which the test chemical leaves the vaporizer 86 through the exit port 142.

A preferred vaporizer 86 according to the invention is available from Armstrong Engineering Associates, Inc. (West Chester, Pa), as their "D" standard model vaporizer, and has the ability to vaporize about 700–840 pounds/hour of toluene, entering the vaporizer as liquid at about 50° F., wherein the heating medium is saturated steam at up to about 75 psig and about 320° F., and wherein the leaving vapor has a temperature of about 250° F. Such a vaporizer has an outer diameter of about 8 inches (about 20 cm) and a length of about 86 inches (about 220 cm). By increasing the steam pressure, a maximum throughput of methylene chloride of about 840 lb/hr may be achieved.

The apparatus of the invention, as best shown in FIG. 2, has a pipe 182 running from the exit port 142 of the vaporizer 86 and terminating within the passageway 196 of a duct 178 that directs a waste gas stream into a thermal oxidizer 200. The duct 178 has a wall 180 that defines the passageway 196 through which the waste stream flows on its way to the thermal oxidizer. The passageway 196 extends longitudinally through the duct, and has an upstream end and a downstream end, where the arrow 186 in FIG. 2 points toward the downstream end, and where the downstream end is defined as being closer to the thermal oxidizer than the upstream end of the passageway 196. A pump or fan (not shown) is typically present in the duct in order to draw waste gas stream through the thermal oxidizer.

The pipe 182 has a longitudinal axis 184, an exterior surface 192, a first end 204 connected to the exit port 142 of the vaporizer and an open second end 208 terminating within the passageway 196 of the duct 178. The pipe 182 extends through the wall 180 of the duct 178 by way of a flange 214 which may already be present as part of the duct 178 or may need to be added to allow the pipe 182 to extend through the wall 180. The pipe 182 preferably extends upward from the vaporizer 86 to the duct 178. The pipe 182 preferably has a valve (not shown) positioned in line of the pipe 182 near the vaporizer exit port 142, which may be opened prior to beginning an efficiency test in order to establish that no liquid is present in the pipe 182 prior to beginning the efficiency test.

The open end 208 of the pipe 182 terminates in an open angled planar end face 212. Preferably, the planar end face 212 is oriented in such a way that it is directed toward the downstream end of the passageway 196, as shown in FIG. 1. Preferably, the angled end face 212 forms an acute angle θ of about 50 to about 75 degrees, and more preferably about 60 degrees with respect to the longitudinal axis 184 of the pipe. The preferred angled end face according to the invention increases the turbulence of the gas flow in the duct, and thus provides a better mix pattern for entainment of the test chemical vapor in the waste gas stream.

A temperature gauge 188 or similar temperature monitoring device is preferably placed so as to monitor the temperature of the vapor flowing in the pipe 182. The inner diameter of the pipe 182 may be about 2 inches (about 5 cm) when methylene chloride is the test chemical, and about 3 inches (about 7.6 cm) when toluene is the test chemical. The diameter of the pipe will vary depending on the identity of the test chemical, due to differences in the density and vapor pressure of the various test chemicals. In general, the pipe diameter should be selected in view of the identity of the test chemical, as well as the flow rate and pressure drop that is desired, which in turn will depend on the pump or fan selected to optimize system design.

When the liquid test chemical enters the vaporizer 86, it contacts steam and thus forms a second mixture comprising test chemical vapor and steam. The second mixture exits the vaporizer through port 142, travels through pipe 182 and enters the duct 178 on the inlet side of a thermal oxidizer 200. The duct 178 carries a waste gas stream, and when the waste gas stream contacts the second mixture, a first mixture is produced comprising test chemical vapor, steam and the waste gas stream. The first mixture is then directed into the inlet side of a thermal oxidizer. Upon passing through the thermal oxidizer, the first mixture is converted into a clean gas stream. Depending on the efficiency of the thermal oxidizer, the clean gas stream may contain residual test chemical vapor, and/or may contain the oxidation products formed from the test chemical vapor. Thus, if the thermal oxidizer is a flame thermal oxidizer, the reaction products are typically the combustion products of hydrocarbons, which will typically include water and carbon dioxide. Hydrochloric acid may also be an oxidation product in instances where the test chemical vapor and/or waste gas stream contains chlorinated hydrocarbons.

Thermal oxidizers are well known pollution control devices, commonly used to treat effluent gases contaminated with combustible impurities. They operate by taking impurity-laden gas to high temperatures, in the presence of oxygen, to thereby cause the combustion of the impurity and produce purified gas. Thermal oxidizers are often employed where the impurity in the gas is organic, and thus readily susceptible to combustion. Thus, during operation, the thermal oxidizers of the invention have an inlet side (not shown), for receiving impurity-containing gas, and an outlet side (not shown), for releasing the treated gas. Any thermal oxidizer known in the art may be used according to the invention, and a thermal oxidizer that passes impurity-laden gas through a flame, known as a flame thermal oxidizer, is well-suited to the inventive method.

In one embodiment, the inventive apparatus 9 is portable and does not include a thermal oxidizer. This embodiment is advantageous in that it may be separated from a thermal oxidizer. The portable apparatus 9 is sufficiently small that it can be transported between thermal oxidizers when an efficiency test is necessary. Also, when the apparatus 9 is being transported, it need not include a forcing means for forcing the liquid test chemical into the vaporizer, such as is provided by the source of pressurized gas (not shown) located at position 58. This is because the portable apparatus may be connected to a source of pressurized gas, or other forcing means, which is available at the site to which the portable apparatus is taken.

The apparatus 9 of the invention may be employed to test the efficiency of thermal oxidizers according to EPA test procedures, and in particular as set forth in EPA Reference Methods 18, 26A and 7D. However, the method of the invention is not limited to use in these particular test methods.

According to a preferred method, prior to beginning an efficiency determination, the entire apparatus shown in FIG. 1 is purged with nitrogen. Then, after ensuring that the drain valves 42, 106, 130 and 134 are closed, the holding tank 26 is filled with a liquid test chemical, e.g., toluene or methylene chloride. Nitrogen gas at a pressure of about 5 to about 10 psig (about 35 to about 70 kPa) is then delivered from source (not shown) located at position 58 through port 54, thus driving liquid test chemical through port 82 and piping 90 and into the vaporizer 86 by way of the first entry port 110. When toluene is the test chemical, a flow rate of about 600 pounds/hour (about 270 Kg/hr) has been satisfactorily employed, while a flow rate of about 200 pounds/hour (about 90 Kg/hr) has been found satisfactory when methylene chloride is the test chemical. Sufficient test chemical is delivered into the vaporizer to fill the vaporizer about one half full of liquid test chemical.

Steam from source 118 is then directed through the second entry port 114 of the vaporizer 86, which causes heating and vaporization of the liquid test chemical. A steam pressure of about 5 to about 25 psi (about 35 to about 175 kPa) is suitable when the test chemical is methylene chloride, while a higher pressure of about 20 to about 40 psi (about 140 to about 280 kPa) is suitable when the test chemical is toluene, due to the higher boiling point of toluene. Gradually, the liquid test chemical level will go down, as seen through the sight gauge 146. Additional test chemical is slowly added to the vaporizer, so that the mass being transferred from the holding tank 26 is equal to the mass being expelled from the vaporizer 86 through the port 142. The equilibrium point may take some trial and error to reach, with variation in test chemical flow rate and steam pressure being the main parameters that will need adjusting.

An LEL monitor may be used to assist in determining the proper flow rates and pressures to provide a steady state flow. An LEL monitor is a safety device that constantly monitors the process air stream and records/shows the concentration of the gases in the duct. For example, it is useful so that an operator can be appraised if the concentration of any vapor in the gas stream is approaching the lower explosion concentration limit of that vapor. Preferably, compliance testing should not commence until after an equilibrium has been established.

The test chemical/steam-mixture (the second mixture) exits the vaporizer through exit port 142, travels through the piping 182, and enters the duct 178 through the end 208 of the pipe 182. The temperature of the material in the line 182, which leads to the duct 178, should be monitored periodically, using the temperature gauge 188, to make certain that the temperature within pipe 182 does not fall below the boiling point temperature of the test chemical, which is, for example, 106° F. (40° C.) for methylene chloride and 230° F. (110° C.) for toluene. If the temperature in the pipe 182 falls below the lower limit, an unsteady flow rate for the test chemical vapor will result. If the temperature within the pipe 182 begins to get undesirably low, then the steam pressure through the vaporizer can be increased. The end 208 of the pipe 182 preferably terminates in about the middle of the passageway 196 of the duct 178, where the duct 178 carries a waste gas stream to a thermal oxidizer. Thus, if the duct 178 has a diameter of about 36 inches, the pipe 182 will extend about 18 inches into the duct.

After being admixed with steam and test chemical vapor, the waste gas stream becomes a first mixture. The first mixture enters the thermal oxidizer, and then exits as a clean gas stream, having been purged of at least some orgainic impurities that were present in the waste gas stream and first mixture. The exiting gas may have a residual amount of test chemical vapor. The amount of test chemical vapor present in the first mixture, and the amount of test chemical vapor or oxidation product thereof in the clean gas stream, are determined and the efficiency of the thermal oxidizer may then calculated.

Determination of the amount of test chemical vapor or oxidation product thereof in the clean gas stream requires application of a means (not shown) for measuring a flow rate of the test chemical vapor or oxidation product thereof exiting the thermal oxidizer. Thus, the apparatus 9 of the invention provides a means for measuring a flow rate of test chemical vapor or oxidation product thereof exiting the thermal oxidizer, where a suitable means is set forth in EPA Reference Methods 18, 26A and 7D. However, the method of the invention is not limited to use in these particular means for measuring a flow rate of the test chemical vapor or oxidation product thereof exiting the thermal oxidizer.

In an actual operation, three 1-hour tests were conducted at 1,500° F. operating temperature. Direct gas chromatography, in accordance with 40 CFR 60, Appendix A, Reference Manual 18 of the EPA was used to determine the emissions of carbon tetrachloride, methylene chloride, toluene, methanol, isopropanol and ethyl acetate. In a representative test run, methylene chloride in the inlet gas stream (first mixture) was 190.6 lb/hr, and methylene chloride in the stack gases (in the clean gas stream exiting the thermal oxidizer) was 0.79 lb/hr, indicating that methylene chloride was combusted at a rate of 189.81 lb/hr. As 85 grams of methylene chloride are consumed through oxidation for every 73 grams of hydrochloric acid produced, the amount of hydrochloric acid produced through this test run was 163.0 lb/hr. The measured amount of hydrochloric acid in the clean gas stream was 0.44 lb/hr. Thus, the acid removal efficiency is equal to $[(163.0-0.44)/163.0] \times 100 = 99.7\%$.

The apparatus and test method of the invention provide a reliable way to introduce a known mass flow rate of liquid test chemical into a thermal oxidizer, so that the efficiency of a thermal oxidizer may be accurately determined. Heretofore, measurements of thermal oxidizer efficiencies, using liquid test chemicals, have been subject to undesirable error due to uncertainty regarding the amount of test chemical that actually entered the thermal oxidizer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for testing the efficiency of a thermal oxidizer comprising:
   (a) a tank containing at least one liquid test chemical;
   (b) a vaporizer, in fluid communication with the tank, for vaporizing the at least one liquid test chemical to form test chemical vapor;
   (c) a thermal oxidizer for oxidizing organic components in a gas stream;
   (d) a duct in fluid communication with the thermal oxidizer for directing a waste gas stream into an inlet side of the thermal oxidizer, the duct also in fluid communication with the vaporizer to allow the test chemical vapor and the waste gas stream to form a first mixture in the duct, the first mixture entering an inlet side of the thermal oxidizer, being converted within the thermal oxidizer to a clean gas stream, and then exiting an outlet side of the thermal oxidizer as the clean gas stream;
   (e) means for measuring a flow rate of the at least one liquid test chemical entering the vaporizer from the tank; and
   (f) means for measuring a flow rate of the test chemical vapor or oxidation product thereof exiting the thermal oxidizer.

2. The apparatus of claim 1 further comprising forcing means for forcing the at least one liquid test chemical from the tank into the vaporizer, and controlling means for controlling the flow rate of the at least one liquid test chemical entering the vaporizer.

3. The apparatus of claim 2 wherein the forcing means comprises a pressurized gas in fluid communication with, and upstream of, the at least one liquid test chemical.

4. The apparatus of claim 3 wherein the controlling means is a valve for modulating pressure of the pressurized gas.

5. The apparatus of claim 1 wherein the liquid test chemical flow rate measuring means is a flow meter.

6. The apparatus of claim 5 wherein the flow meter is a rotameter.

7. The apparatus of claim 1 wherein the at least one liquid test chemical is selected from the group consisting of toluene and methylene chloride.

8. The apparatus of claim 1 wherein the thermal oxidizer is a flame thermal oxidizer.

9. The apparatus of claim 1 wherein the vaporizer is in fluid communication with a source of pressurized steam, and the vaporizer is configured for providing contact between the at least one liquid test chemical and steam from the source of pressurized steam to form a second mixture comprising test chemical vapor and steam within the vaporizer.

10. The apparatus of claim 9 wherein the duct has a wall defining a passageway extending longitudinally through the duct, the passageway has an upstream end and a downstream end where the downstream end is defined as being closer to the thermal oxidizer than the upstream end, the vaporizer comprises an exit port for releasing the second mixture from the vaporizer, and the apparatus further comprises a pipe having a longitudinal axis, an exterior surface, a first end connected to the exit port of the vaporizer and an open second end extending through the wall and terminating within the passageway.

11. The apparatus of claim 10 wherein the open end of the pipe terminates in an open angled planar end face oriented in such a way that the open angled planar end face is directed toward the downstream end of the passageway.

12. The apparatus of claim 11 wherein the angled end face forms an acute angle of about 55 degrees to about 75 degrees with respect to the longitudinal axis of the pipe.

13. A portable apparatus comprising
   (a) a platform, the platform having directly or indirectly mounted thereto:
      (i) a tank holding at least one liquid non-aqueous test chemical;
      (ii) a vaporizer, in fluid communication with the tank, for vaporizing the at least one non-aqueous liquid test chemical received from the tank to form test chemical vapor; and
   (b) means for measuring a flow rate of the at least one non-aqueous liquid test chemical entering the vaporizer from the tank.

14. The apparatus of claim 13 further comprising forcing means for forcing the at least one liquid test chemical from the tank into the vaporizer, and controlling means for controlling the flow rate of the at least one liquid test chemical.

15. The apparatus of claim 14 wherein the forcing means comprises a pressurized gas in fluid communication with the interior space of the tank.

16. The apparatus of claim 14 wherein the means for controlling the flow rate of the at least one liquid test chemical is a valve for modulating pressure.

17. The apparatus of claim 14 wherein the flow rate controlling means is a flow meter.

18. The apparatus of claim 17 wherein the flow meter is a rotameter.

19. The apparatus of claim 13 wherein the vaporizer is configured for receiving steam from a source of pressurized steam, and for providing contact between the at least one non-aqueous liquid test chemical and steam from the source of pressurized steam to from a mixture comprising test chemical vapor and steam within the vaporizer.

20. The apparatus of claim 13 wherein the vaporizer further comprises an exit port for releasing the test chemical vapor from the vaporizer, and the apparatus further comprises an entry duct appended to an inlet side of thermal oxidizer for providing fluid communication between the vaporizer and the entry duct, and a pipe having a longitudinal axis, a first end connected to the exit port of the vaporizer and a second end terminating in an open end face lying in a plane, the second end extending into a passageway of the entry duct.

21. The apparatus of claim 20 wherein the longitudinal axis of the pipe and the plane of the open end face of the pipe intersect at an acute angle.

22. The apparatus of claim 21 wherein the acute angle is about 50 degrees to about 75 degrees.

23. A method for determining the efficiency of a thermal oxidizer, comprising the steps of:
   (a) introducing at least one liquid test chemical into a vaporizer at a measured flow rate over a period of time;
   (b) vaporizing the test chemical to form test chemical vapor;
   (c) directing the test chemical vapor into an entry duct of a thermal oxidizer, the duct containing a waste gas stream which is combined with the test chemical vapor to form a first mixture;
   (d) directing the first mixture through the entry duct and into an inlet side of the thermal oxidizer;
   (e) measuring a flow rate of the test chemical vapor or oxidation product thereof exiting an outlet side of the thermal oxidizer;
   (f) calculating the efficiency based on the flow rates of steps (a) and (e).

24. A portable apparatus comprising
   (a) a platform, the platform having directly or indirectly mounted thereto:
      (i) a tank holding at least one liquid test chemical;
      (ii) a vaporizer, in fluid communication with the tank, for vaporizing the at least one liquid test chemical received from the tank to form test chemical vapor; and
   (b) means for measuring a flow rate of the at least one liquid test chemical entering the vaporizer from the tank; wherein the liquid test chemicals are selected from the group consisting of toluene, methylene chloride, amyl alcohol, butyl alcohol, chloral, cyclohexanone, decane, ethyl benzene, furfural alcohol, isoamyl alcohol, isoamyl acetate, isobutyl alcohol, isobutyl acetate, methyl isobutyl ketone, tetrahydrofuran and xylene.

* * * * *